United States Patent
Zintler et al.

(10) Patent No.: US 6,377,005 B1
(45) Date of Patent: Apr. 23, 2002

(54) DRIVE DEVICE HAVING AN ACTUATING DRIVE

(75) Inventors: Albert Zintler, Gross-Gerau; Wolfgang Mücke, Frankfurt; Reinhard Stalter, Usingen, all of (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/382,545

(22) Filed: Aug. 25, 1999

(30) Foreign Application Priority Data

Sep. 1, 1998 (DE) .......................... 198 39 706
Oct. 19, 1998 (DE) .......................... 198 48 081

(51) Int. Cl.⁷ .............................................. H02K 7/10
(52) U.S. Cl. .................... 318/9; 70/271; 70/275; 70/276; 318/653
(58) Field of Search .................. 70/262, 271, 275, 70/276, DIG. 30; 340/426, 542; 318/3, 4, 9, 652, 653, 445, 446, 466

(56) References Cited

U.S. PATENT DOCUMENTS

| 5,240,296 A | 8/1993 | Kobayashi | 292/201 |
| 5,808,555 A * | 8/1998 | Bartel | 70/278 |
| 5,878,610 A * | 3/1999 | Friedrich | 70/264 |
| 5,890,384 A * | 4/1999 | Bartel et al. | 20/264 |
| 5,892,443 A * | 4/1999 | Friedrich | 70/276 |

FOREIGN PATENT DOCUMENTS

| DE | 4219209 | 12/1993 |
| DE | 4420692 | 12/1994 |
| DE | 195 06 938 | 8/1996 |
| DE | 197 39 682 | 3/1999 |

OTHER PUBLICATIONS

Japanese Abstract 8–68606A; Angle–of–Rotation Detection Apparatus published Mar. 12, 1996.

* cited by examiner

*Primary Examiner*—David S. Martin
(74) *Attorney, Agent, or Firm*—Martin A. Farber

(57) ABSTRACT

A drive device, in particular a locking device, having an actuating drive for driving a moving element as well as a position detection device for detecting the position of the moving element, in which case the invention provides that the position detection device has a magnet element which is fitted to the moving element, as well as a Hall element which is arranged in the vicinity of the magnet element, in which case the Hall element is integrated in an electronic module.

13 Claims, 3 Drawing Sheets

DRIVE DEVICE HAVING AN ACTUATING DRIVE

FIELD AND BACKGROUND OF THE INVENTION

The invention relates to a drive device having an actuating drive as well as a position detection device.

U.S. Pat. No. 5,240,296 discloses such a drive device, which in this case is in the form of a locking device for a door of a vehicle, in which case a moving element which is in the form of a lever can be moved to two positions by an actuating drive, and the lever can lock and unlock the locking device.

The position detection device is a potentiometer whose conductor tracks are printed on a printed circuit, in which case these conductor tracks are made contact with by wipers, which are attached to the lever. Depending on the position in which the lever is located, the "locked" or "unlocked" position is detected and, furthermore, the actuating drive is switched on and switched off as a function of the detected position.

The way in which the actuating drive operates and its actuation as well as the detection of the position of the moving element intrinsically works satisfactorily, so that the desired positions can be identified.

However, a major disadvantage in this case is that the position detection device is subjected to severe environmental conditions, such as those which occur in vehicles, and these (the following may be mentioned in this context: temperature fluctuations, moisture, dust and the like) can lead to the position detection device malfunctioning. Furthermore, a position detection device in the form of a potentiometer is subject to wear, which occurs particularly when used in vehicles where the locking device is operated very frequently. In this context, one could consider using appropriate materials which are not subject to such high wear; however, as a rule, these are costly and, in fact, cannot be used for cost reduction in large-scale production.

Furthermore, a position detection device in the form of a potentiometer has the disadvantage that contact resistances can occur at the junction point between the wiper and the conductor track, and these lead to corruption of the indicated position so that, the correct position is not always indicated reliably, even in this case. However, correct indication of position is, in fact, absolutely essential in the application of a locking device since, for example, the actuating drive and thus the entire locking device may be in the "locked" state while the position detection indicates "unlocked" so that the actuating drive would then not be actuated at all, since the position detection device indicates that the actuating drive is already in the "unlocked" position, and it would thus be possible to open the door.

SUMMARY OF THE INVENTION

The invention is thus based on the object of improving the drive device (mentioned initially) having an actuating drive and a position detection device, in such a manner that the described disadvantages are avoided, thus resulting in reliable operation with a very simple formation.

The invention provides that the position detection device has a magnet element which is fitted to the moving element, as well as a Hall element which is arranged in the vicinity of the magnet element, in which case the Hall element is integrated in an electronic module.

The position of the moving element is detected using the physical Hall effect, which is described briefly at the end.

Since the moving element and the position detection device now no longer touch one another, this position detection device operates without making contact and thus without wear, so that, in consequence, the function of the drive device works reliably throughout the entire intrinsic life or throughout the entire life of the object in which it is fitted (for example a vehicle). The design and assembly of the drive device according to the invention are particularly simple, since there is no need for any alignment between the magnet element and the Hall element and sufficiently accurate proximity is adequate to ensure operation of the position detection device. Furthermore, there is no need to fit conductor tracks on the printed circuit or for the presence of wipers and wiper supports of a potentiometer, which actually become particularly complex if it is necessary to monitor the position through a number of revolutions of the moving element.

In a development of the invention, the electronic module is in the form of an ASIC. The term ASIC means an electronic module which has been specified during production or by programming for its application and for the tasks in question. An ASIC includes input and output circuits, memory, processors, monitoring devices (for temperature, voltage, short circuit and the like), sensors (for example the Hall element) and so on. This has the advantage that an integrated module is provided in a very small space. Further advantages include the reduced rest-current consumption, since the only functions which are implemented are those which are required for the respective application, and thus reduced manufacturing costs as well. Testing of an ASIC is likewise simplified, since there is no need to test all the functions of a multifunctional chip which is normally used. One important factor is still very good copying protection, since it is not possible to see from the outside of the ASIC what components it contains and which functions it provides. The integration of the sensor thus provides a so-called active sensor, which provides a signal which has already been evaluated and may have been filtered, for further processing. Signal processing at the detection point also allows sensitive and small measurement variables to be detected, amplified and passed on after evaluation, so that the sensitivity to interference is in consequence reduced. This is particularly important for the application in vehicles since malfunctions are often caused by electromagnetic interference in this case.

In a development of the invention, the electronic module has an evaluation circuit for the output signals of the Hall element and/or an actuation circuit for producing actuation signals for the actuating drive. This increases the compactness of the design since the actuation circuit as well as the evaluation circuit are integrated in the electronic module. It is also advantageous that there is no need for any further wiring, since the electronic module can be arranged with its evaluation circuit and its actuation circuit in the physical vicinity not only of the moving element but also of the actuating drive. This results in a drive device having an integrated actuating drive and an integrated sensor system, in which case the only wiring which need be routed to this drive device is that for the power supply and, possibly, for other signals by means of which the actuating drive is intended to be actuated from the outside.

A further advantage for use of the electronic module within the drive device and for integration of the evaluation circuit and/or of the actuation circuit in the electronic module is that the connection between the evaluation circuit and the Hall element which supplies the output signal as a function of the position, as well as the connection between the actuation circuit and the actuating drive can be kept extremely short, so that there is no need for any measures which would be required to prevent disturbances from radiated interference. This avoids not only the shielding against electromagnetic interference radiation, but also improves the reliability of the overall drive device.

In a development of the invention, the electronic module is arranged on a printed circuit which, in particular, is in the form of a flexible printed circuit, in which case the printed circuit is inserted in a housing of the drive device.

This makes the device very easy to assemble since, on the one hand, the printed circuit can be prefabricated at least together with the electronic modules and, possibly, with further wiring and further modules in a first step, in which case, on the other hand, the moving element, the actuating drive and further functional elements of the drive device can be inserted into the housing at this stage, so that, once they have been inserted, it is only necessary to fit the printed circuit with the electronic module, and the assembly of the drive device is thus complete. This assembly process substantially simpler since there is no need for any accurate alignment between the moving element and the position detection device, although it is necessary to ensure that the electronic module is arranged with its Hall element in the vicinity of the magnet element, which is attached to the moving element. The printed circuit in the housing may be a discrete component while, in contrast, it is also feasible for the printed circuit to be inserted into the housing cover first and then to be fitted onto the housing, or else to be an integral component of the housing cover. In this case, one conceivable production process would be for the printed circuit together with the electronic module to be produced first of all and, after this, for at least these two components to be surrounded (extrusion coated) with plastic in the form of a housing cover, so that both the printed circuit and the electronic module with its Hall element are located under the plastic coating, such that they are completely protected. During the production of such a housing cover, which may also intrinsically relate to the housing itself, connecting means can also be provided, such as plugs or sockets or the like. In order, for example, to produce the connection between a plug and the electronic module, the latter need not necessarily be a printed circuit with conductor tracks on it so that, instead of this, all that is necessary is for it to be possible to produce the conductor tracks, for example in the form of stamped conductor tracks, in the plastic housing cover. A flexible printed circuit can be accommodated particularly well in housings of complex design and is particularly advantageous in applications which are subject to oscillations and vibration, since these can be absorbed better by a flexible printed circuit than by a rigid printed circuit.

Hybrid modules or so-called lead frames are available as alternatives to printed circuits. A hybrid module comprises an electronic circuit which includes a plurality of electronic components (resistors, capacitors, processors, sensors). Such a module can thus be wired up just for one specific application, and just has to be inserted into the housing and connected to its peripherals (in particular a power supply).

The term lead frame means a component which initially has an electrically non-conductive substrate, composed, in particular, of plastic. This substrate is in the form of a largely planar surface, but can be bent, kinked or formed in some other suitable way for matching to the installation location. Electrically conducted regions, in particular tracks, are inserted in the substrate and are composed, for example, of stamped sheet-metal parts. One possible way of producing a lead frame is to place the stamped sheet-metal parts in a mold, and to extrusion-coat them with plastic. At the points at which an electrical component is located on the substrate, the relevant electrically conductive regions are connected to the outside and make contact with the relevant component. Plugs or the like can also be formed integrally with the substrate, or are likewise made contact with as a separate component. Thus, once again, after the fitting of the lead frame, this results in an electronic module whose functionality can be checked before installation in the housing. Only functional modules are thus installed in the housing, so that one possible fault source after completion of the entire drive device is prevented.

In a development of the invention, the magnet element is arranged in a magnet element holder, which is attached to a shaft of the moving element. This has the advantage of simple assembly, so that all that is necessary is just to plug the magnet element onto the shaft by means of the magnet element holder, although other attachment options (for example bonding) are also conceivable. The use of the magnet element holder furthermore also has the advantage that tolerances, in particular in the axial direction, can be compensated for by means of this magnet element holder. In addition, one and the same magnet, in particular a permanent magnet, can be fitted via this magnet element holder to different shafts or other moving elements which have different geometric shapes. Conversely, it is, of course, also conceivable to use different magnets on one and the same moving element via the magnet element holder.

As has already been described initially, one particularly advantageous application of the device according to the invention is in a locking device, in particular for a vehicle, since the operating conditions here are severe, and can be eliminated by the use of a Hall element according to the invention. Although this field of application is regarded as being particularly preferred, it should also be mentioned that the invention is not limited to this field of application, and other applications of the drive device according to the invention are conceivable, without leaving the idea of the invention.

BRIEF DESCRIPTION OF THE DRAWINGS

The use of the drive device according to the invention in a locking device is described in the following text and is explained with reference to the figures of the drawings, in which.

DETAILED DESCRIPTION OF THE PREFERRED EMBODIMENT

Figure 1:
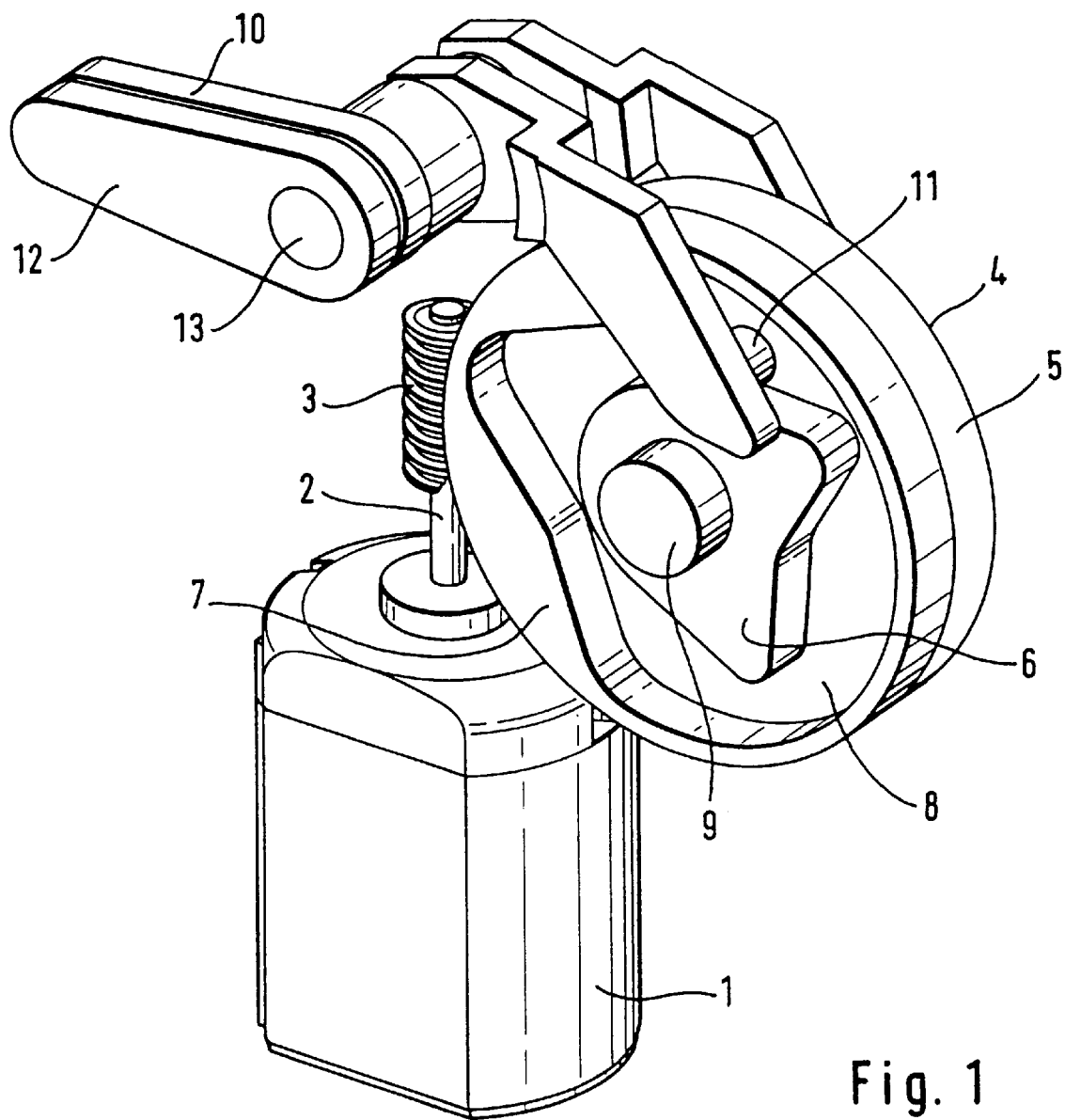
FIG. 1 shows the principle of the design of a locking device.

FIG. 1 shows an electrically operable locking device having an actuating drive which is in the form of an electric motor 1. A worm gear 3 is seated on a shaft 2 of the electric motor 1, in which case a transmission element in the form of a control cam 4 is driven by the electric motor 1. An external circumference 5 of the control cam 4 is provided with teeth (not shown in FIG. 1) which engage with the worm gear 3 and thus form a step-down transmission. At least one side of the control cam 4 has inner projections 6 and outer projections 7, which form an intermediate region. The inner and outer projections 6, 7 form a contoured profile for setting various functions of the locking device, as will be described later.

The control cam 4 is mounted on a shaft 9 such that it can rotate. The reference number 10 denotes a first lever, whose end facing the control cam 4 is fitted with a pin 11 which projects into the intermediate region 8 and can come into contact with the contours of the inner projections 6 and outer projections 7. Furthermore, FIG. 1 also shows a second lever 12, which is mounted on a common shaft 13 with the first lever 10 and can be set independently of the first lever 10, by means of inner projections and outer projections on the other side of the control cam 4. At this point, it should be mentioned that, with the embodiment shown in FIG. 1, the operation of the internal door handle or of the external door handle may or may not be transmitted to lock elements such as a locking catch or tumblers, depending on the positions of the levers 10 and 12. It is also conceivable for a single handle (such as an internal door handle) to be provided with its own electric motor 1 with its own control cam 4 and inner projections 6 and outer projections 7 on only one side, and with only a single lever. Since the design of the lock elements does not affect the configuration of the actuating drive, this has not been illustrated. However, for clarification, it should e mentioned that a handle is connected via Bowden cables to a further lever which can be operated, for example, by the first lever 10. The further lever acts on lock elements, for example on the locking catch which interacts with a tumbler. In one of its positions, the action of the first lever 10 is then such that the further lever can act on the locking catch when the handle is operated while, in its other position, the first lever 10 acts on the further lever such that the operation of the handle cannot act on the locking catch (inactive travel).

This embodiment, which is shown in FIG. 1, thus allows an extremely flat construction, which permits all the functions of an electrically operable locking device, such as "unlocking", "(central) locking" and "anti-theft protection" (possibly also a "child lock"). By appropriate actuation of the electric motor 1 and the movement of the levers 10 and 12 as a function of the contours of the control cam 4, the locking functions are provided for two handles (for example an internal and an external door handle) with only one actuating drive (electric motor 1).

Figure 2:
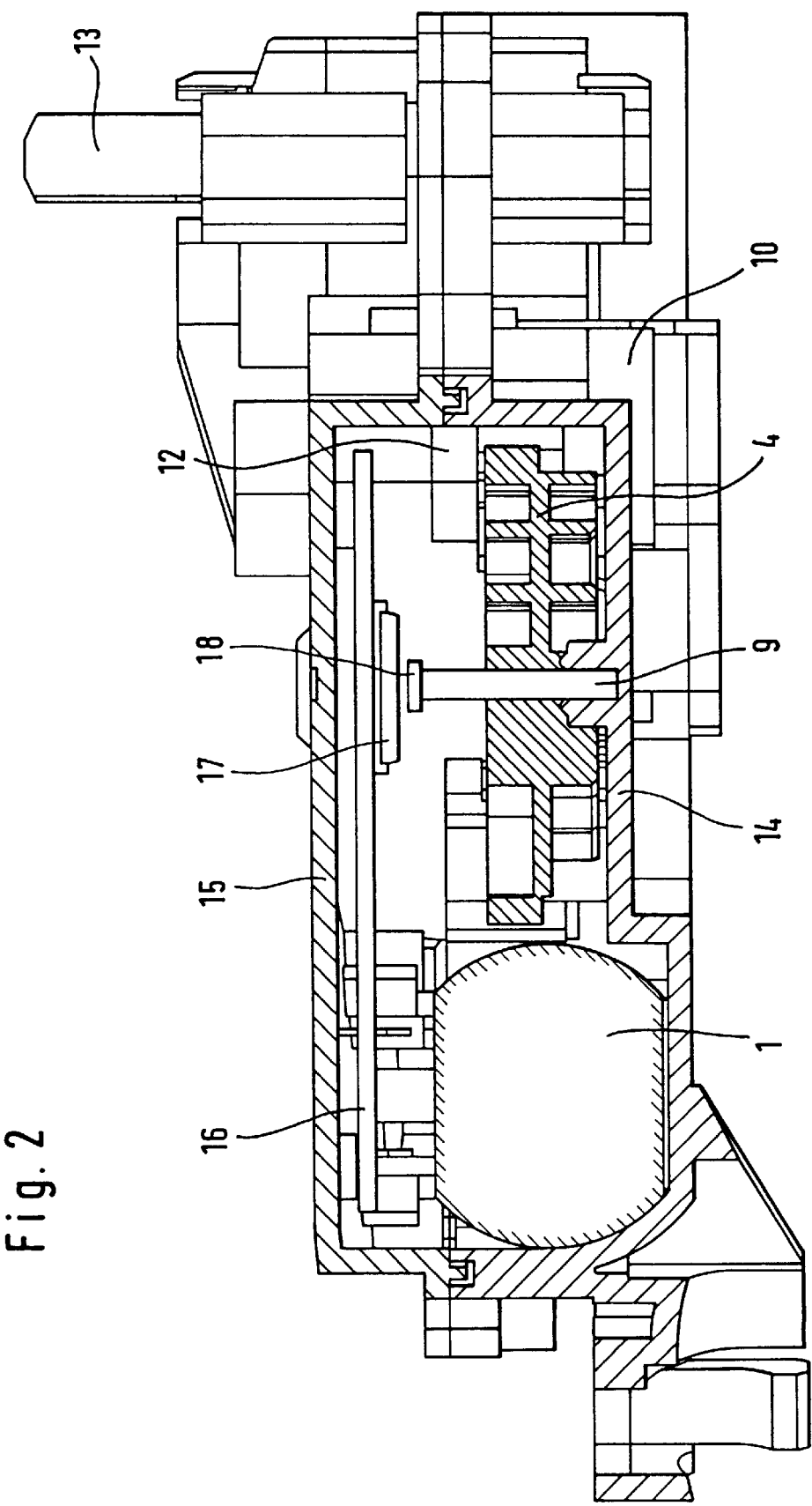
FIG. 2 shows the arrangement of the elements shown in FIG. 1, in a housing.

FIG. 2 shows the arrangement of the elements shown in FIG. 1, in a housing 14. In the view in FIG. 2, this housing 14 is open at the top and is closed, forming a seal, by a housing cover 15. To this end, a seal (which is not shown or denoted by any number) is provided circumferentially at the junction point between the housing 14 and the housing cover 15, so that the elements shown in FIG. 1 and further elements are accommodated in a moisture-tight and dust-tight manner in the housing 14, covered by the housing cover 15.

A printed circuit 16 is inserted into the housing 14, for which purpose appropriate means (for example pins or the like) are provided on the housing 14 or on the housing cover 15 or on both, in order to hold the printed circuit 16. The printed circuit 16 is thus, for example, inserted into appropriate cutouts, or the printed circuit 16 has holes by means of which it is guided over pins in the housing 14, in which case appropriate mating pins are provided in the housing cover 15, to fix the printed circuit 16 in its position.

In the region of the moving element whose position is intended to be detected (in this case the shaft 9 of the control cam 4), the printed circuit 16 is fitted with an electronic module 17 which is electrically connected via lugs to the printed circuit 16 and to its conductor tracks (which are not shown). The electronic module 17 may also, if required, be mechanically fixed on the printed circuit 16. At the end facing the electronic module 17, the shaft 9 is fitted with a magnet element 18, so that rotation of the shaft 9 also causes the magnet element 18 to rotate with its north and south poles, and this rotation is detected and evaluated by the electronic module 17. This detection and evaluation will now be described in the following text.

Figure 3:
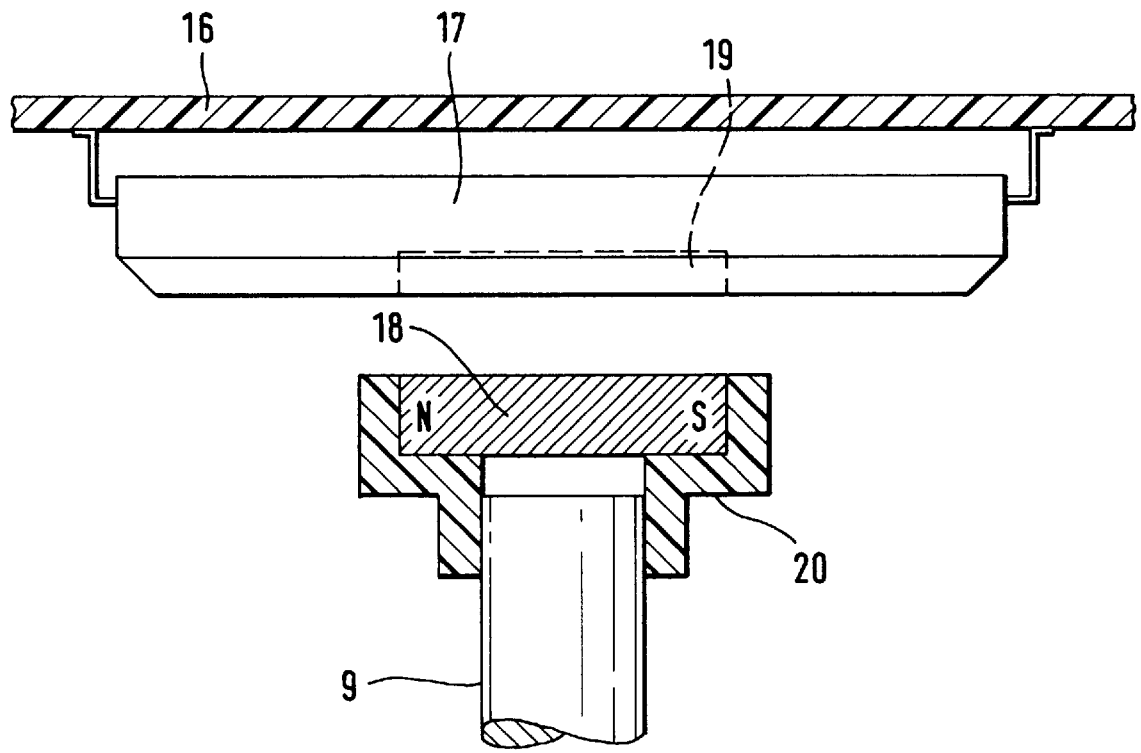
FIG. 3 shows a detail from FIG. 2, relating to the position detection device.

FIG. 3 shows a detailed view of the electronic module 17 and of the magnet element 18. A Hall element 19, which reacts to the rotation of the magnet element 18, is also arranged in the electronic module 17, in which an evaluation circuit (which is not shown) is accommodated. The magnet element 18 is a permanent magnet having a north pole (N) and a south pole (S). Rotation of the magnet element 18 varies the current flow in the Hall element 19 and produces a so-called Hall voltage, so that the output signal from this Hall element 19 is a digital signal or else a continuous signal (signal sequences) if the magnet element 18 rotates more than once. This output signal from the Hall element 19 is evaluated by the evaluation circuit, and this may be done, for example, by counting the output pulses from the Hall element 19. This evaluated output signal can then be converted into an actuation signal for the actuating drive (electric motor 1) in which case, for example, the electric motor 1 is actuated until a further position is reached. Once the fact that this position has been reached has been identified, the electric motor 1 is switched off. Advance braking for the electric motor 1 can also be provided by means of the evaluation circuit and actuation circuit which are integrated in the electronic module 17, so that, when an initial position before a specific position has been detected, the control for the electric motor 1 can be regulated down so that, rather than the electric motor 1 being switched off only when it reaches its predetermined position, it reaches this position slowly, and overshooting is avoided. In consequence, there is no need for complex regulation of the actuation for the electric motor 1 in order for the latter to reach its position.

A magnet element holder 20, which holds the magnet element 18, is also fitted on the shaft 9. The magnet element holder 20 is produced, for example, from plastic and connects the magnet element 18 to the end of the shaft 9 by clamping, in which case the magnet element 18 can move axially in the direction of the Hall element 19 or away from it, in order to allow axial adjustment of the position of the Hall element 19 with respect to the magnet element 18, in order to compensate for tolerances. Furthermore, the fact that the magnet element 18 is arranged at a distance from the end of the shaft 9 means that magnetization of the shaft 9 (which is made of magnetic material) is very largely avoided, which could lead to undesirable effects.

Furthermore, FIG. 2 also shows that both the electronic module 17 and the magnet element 18 are arranged in the housing 14 with the housing cover 15 such that they are protected against external influences. Should such a protected arrangement not be possible owing to the geometric relationships and/or the physical volume, a protective housing can also be provided around the magnet element 18 and the electronic module 17. An arrangement would also be conceivable, in which, in FIG. 2, the printed circuit 16 has a recess into which the magnet element 18 projects, and the electronic module 17 is then arranged above the printed circuit 16 in the view in FIG. 2. This leads to a further advantageous reduction in physical volume.

At this point, the intention is to briefly describe the principle of the method of operation of a Hall element, and its evaluation. The Hall element has a stabilized current I flowing through it. A magnet, which can be operated by a moving operating element or is arranged in a fixed position on this operating element, produces a magnetic field B which acts on the Hall element. The so-called Hall voltage $U_H$ which is produced when the magnetic field B of the magnet is moved toward or away from the Hall element is tapped off on the Hall element and is supplied to an evaluation unit. The evaluation unit has an external voltage supply, which it receives via appropriate wires (for example a voltage wire and an earth wire). Furthermore, a signal wire is provided, so that the evaluated Hall voltage $U_H$ can be made available for further processing, for example via the signal wire and the earth wire. In this case, this is a so-called intelligent evaluation unit, which provides an output signal that has already been processed. A current source is provided, in particular in the evaluation unit, in order to produce the stabilized current I through the Hall element.

LIST OF REFERENCE SYMBOLS

1. Electric motor
2. Shaft
3. Worm gear
4. Control cam
5. External circumference
6. Inner projections
7. Outer projections
8. Intermediate region
9. Shaft
10. First lever
11. Pin
12. Second lever
13. Common shaft
14. Housing
15. Housing cover
16. Printed circuit
17. Electronic component
18. Magnet element
19. Hall element
20. Magnet element holder

We claimed:

1. A drive device for a locking device of a vehicle having an actuating drive for driving a control cam (4) mounted on a shaft (9) rotatable together with the control cam (4) as well as a position detection device for detecting the position of the control cam (4), with a lever pivotable on an axis for setting functional positions of the locking device which lever is in contact with the contour of the control cam (4), wherein the position detection device has a magnet element (18) which is fitted to the control cam (4), as well as a Hall element (19) which is arranged in the vicinity of the magnet element (18), in which case the Hall element (19) is integrated in an electronic module (17).

2. The drive device as claimed in claim 1, wherein the electronic module (17) is in the form of an ASIC, a n Application-Specific Integrated Circuit.

3. The drive device as claimed in claim 1, wherein the electronic module (17) has an evaluation circuit for the output signals of the Hall element (19), and/or an actuation circuit for producing actuation signals for the actuating drive.

4. The drive device as claimed in one of claims 1 to 3, wherein the electronic module (17) is arranged on a printed circuit (16), in particular a flexible printed circuit, in which case the printed circuit (16) is inserted in a housing (14) of the drive device.

5. The drive device as claimed in claim 1, wherein the electronic module (17) is in the form of a hybrid module which comprises a plurality of electronic components, in which case the hybrid module is inserted in a housing (14) of the drive device.

6. The drive device as claimed in claim 1 wherein the electronic module (17) is arranged on a lead frame, in which case the lead frame is inserted in a housing (14) of the drive device.

7. The drive device as claimed in claim 1 wherein the electronic module (17) is arranged on a printed circuit (16), in which case the printed circuit is inserted in a housing cover (15) for a housing (14) of the drive device, or is a component of the housing cover (15).

8. The drive device as claimed in claim 1 wherein the magnet element (18) is arranged in a magnet element holder (20) which is attached to a shaft (9) of the moving element.

9. The drive device as claimed in claim 1 wherein the actuating drive is in the form of an electric motor (1).

10. The drive device as claimed in claim 1 wherein at least the magnet element (18) is accommodated in a protective housing, in particular the housing (4), which surrounds the magnet element (18).

11. The drive device as claimed in claim 1, wherein at least the magnet element (18) is accommodated in a protective housing (4) which surrounds the magnet element (18), with a printed circuit (16), in particular a flexible printed circuit, inserted into the housing (4) and fitted with the electronic module (17), the electronic module (17) facing the magnet element (18).

12. The drive device as claimed in claim 1, further comprising a second lever pivotable on said axis for setting further functional positions of the locking device, wherein the second lever is in contact with a further contour of the control cam (4).

13. The drive device as claimed in claim 1, wherein the shaft extends from the control cam to the location of the Hall element and holds the magnet element continuously adjacent the Hall element independently of rotation of the control cam and independently of rotation of the shaft.

* * * * *